United States Patent [19]

Nonaka

[11] 4,100,244
[45] Jul. 11, 1978

[54] METHOD FOR DIRECTLY COOLING MELTED THERMOPLASTIC RESINS

[75] Inventor: Hidehiro Nonaka, Hiroshima, Japan

[73] Assignee: Japan Steel Works LTD, Japan

[21] Appl. No.: 520,131

[22] Filed: Nov. 1, 1974

Related U.S. Application Data

[63] Continuation of Ser. No. 336,553, Feb. 28, 1973, abandoned.

[51] Int. Cl.² .............................................. B29F 3/08
[52] U.S. Cl. ..................................... 264/211; 366/75;
264/28; 264/102; 264/237; 425/379 R
[58] Field of Search ............... 264/349, 211, 101, 102,
264/68, 176 R, 28, 237; 259/100, 109, 185, 191;
425/378–379, 203; 159/2 E

[56] References Cited

U.S. PATENT DOCUMENTS

| | | | |
|---|---|---|---|
| 2,561,043 | 7/1951 | Ayers | 264/68 |
| 2,615,199 | 10/1952 | Fuller | 264/211 |
| 2,796,632 | 6/1957 | Willert | 425/378 |
| 2,833,750 | 5/1958 | Vickers | 264/102 |
| 2,974,371 | 3/1961 | Meakin | 264/28 |
| 3,078,511 | 2/1963 | Street | 264/349 |
| 3,082,816 | 3/1963 | Skidmore | 264/101 |
| 3,260,774 | 7/1966 | Harlow | 264/28 |
| 3,267,075 | 8/1966 | Schnell | 264/102 |
| 3,327,034 | 6/1967 | Klosek et al. | 264/68 |
| 3,476,736 | 11/1969 | Kahre | 159/2 E |
| 3,567,813 | 3/1971 | Keane et al. | 264/102 |
| 3,673,126 | 6/1972 | Carmody et al. | 264/349 |
| 3,799,234 | 3/1974 | Skidmore | 425/203 |
| 3,917,507 | 11/1975 | Skidmore | 159/2 E |

*Primary Examiner*—Jeffery R. Thurlow
*Attorney, Agent, or Firm*—McGlew & Tuttle

[57] ABSTRACT

Direct cooling of melted thermoplastic resins, while in a continuous extruding operation, can be achieved, by pouring into them a coolant such as pure water, liquid nitrogen or the like in the cooling region of the continuous extruder so that the resins are directly cooled by the latent heat of the coolant or the temperature difference between the resins and the coolant.

6 Claims, 1 Drawing Figure

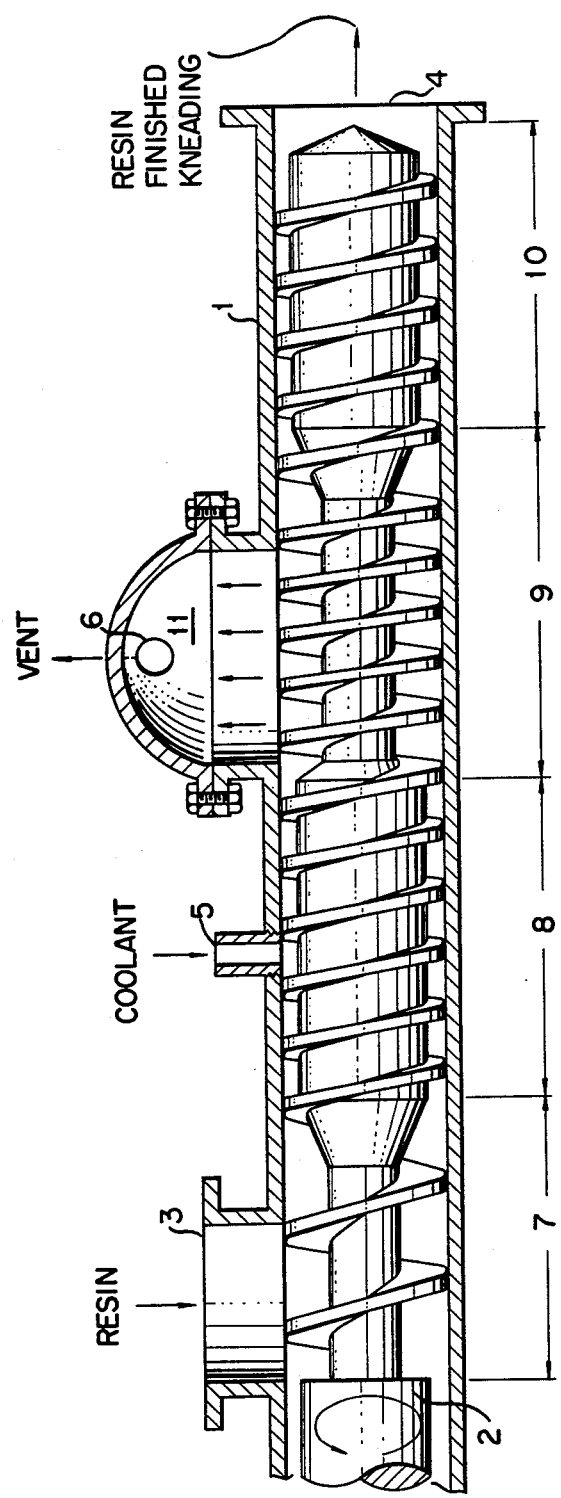

METHOD FOR DIRECTLY COOLING MELTED THERMOPLASTIC RESINS

This is a continuation, of application Ser. No. 336,553 filed Feb. 28, 1973, now abandoned.

BACKGROUND OF THE INVENTION

This invention relates to a method for cooling melted thermoplastic resins, and more particularly to a method for direct cooling a melted thermoplastic resin being under a continuous extrusion operation in a continuous extruder.

Hitherto, as a cooling method for the melted thermoplastic resins being under a continuous extrusion operation, the indirect cooling through a cylinder and a screw has been used.

On this outside cooling method, cooling capacity is limited because of the small film coefficient of heat transfer at the side of the resins.

When the resin is mixed and kneaded to improve its quality or it is extruded at medium shearing speed of more than 50 sec$^{-1}$, the internal heat due to its viscosity rises over the cooling capacity or becomes into an equibrium state, so that it is very difficult to cool the resin below the temperature of the resin flowing to the cooling region.

Therefore, the temperature of the resin flowing to the mix-kneading region of the continuous extruding machine rises too high and sufficient kneading cannot be obtained in the mix-kneading region, or else the temperature of the resin in the mix-kneading region or at the outlet of the discharge portion rises over the permitted temperature, resulting to inferior quality of the resin. These phenomena are serious defects of the method.

SUMMARY OF THE INVENTION

It is an object of the present invention to provide a method for cooling melted thermoplastic resins to eliminate the defects inherent to the conventional methods as abovesaid.

It is another object of the present invention to provide a method for cooling melted thermoplastic resins in which the thermoplastic resin flowing in the cooling region is effectively cooled within a limited cooling region, and down to the extent where the temperature of the resin at the outlet of the cooling region is kept low enough to obtain an effective mixing of the resin in the mix-kneading region or where the resin temperature at the mix-kneading region or at the outlet of the discharge region is kept within an allowable range by external cooling alone.

In accordance with the present invention a method is provided for cooling melted thermoplastic resins which comprises directly and continuously pouring a coolant in a fixed quantity into the resin under extrusion, said coolant being such a material as, e.g., water whose boiling point is low and evaporation latent heat large enough, or, e.g., liquid nitrogen whose temperature difference from the resin is large enough, without chemically reacting with the resin and its basic physical properties remaining unaffected, so that it is dispersed, vaporizing the coolant just before the inlet of the mix-kneading region so that the latent heat of said coolant or the temperature difference between the resin and said coolant being utilized to cool the resin, and degasing the resin up to its permissible residue.

BRIEF DESCRIPTION OF THE DRAWING

The above and other objects, features and advantages of the invention will be more readily understood from the following detailed description in conjunction with the accompanying drawing which diagrammatically shows a continuous extruder in section for practising the method according to the present invention.

DESCRIPTION OF THE PREFERRED EMBODIMENTS

An experiment of the method according to the present invention was carried out using a low density polyethylene as a resin to be mix-kneaded and pure water as a coolant. An outline of the continuous extruder experimented with is diagrammatically shown in the attached drawing in section, in which the reference numerals represent respectively the following parts or portions:

1 ... cylinder; 2 ... screw; 3 ... resin inlet; 4 ... resin outlet; 5 ... coolant inlet; 6 ... vent orifice; 7 ... feed region; 8 ... primary mix-kneading region; 9 ... cooling region; 10 ... final mix-kneading region; 11 ... vapor.

The coolant (pure water) was continuously poured in a fixed quantity into the resin at the primary mix-kneading region 8 of a continuous extruder, which is dispersed under a low pressure and vaporized at the outlet of the cooling region 9, the resin being discharged from the final mix-kneading region 10 through the resin outlet 4.

The results of the experiment are given in Table.

Table

| Quantity of resin kg/H | Quantity of pure water injected wt % | Temperature of resin at inlet of cooling region °C | Temperature of resin at outlet of cooling region °C | Outside Cooling of the continuous extruder machine |
|---|---|---|---|---|
| 204 | 0 | 175 | 202 | Water by cooling |
| " | 6.8 | " | 156 | " |
| " | 13.4 | " | 130 | " |

As apparent from Table, it can be understood that, according to the present invention, thermoplastic resins under the continuous extruding operation can be directly and effectively cooled by a relatively simple procedure.

Moreover, according to the present invention, the temperature of the resin at the inlet of the final mix-kneading region can be controlled optionally by adjusting the quantity of coolant poured without any change of the fundamental property of the resin and the satisfactory effect of mixing and kneading can be obtained.

Further, according to the present invention, in case of extrusion at a medium speed, the temperature of the resin at the outlet of the final mix-kneading region can be controlled at will by an appropriate control of the quantity of the coolant introduced into the resin.

While only a single preferred embodiment of the invention has been disclosed and detailedly described in the foregoing, it will be understood that various modifications can be made in the invention without departing from the scope or spirit thereof. Therefore, the limits of the invention should be determined from the following claims.

What is claimed is:

1. Method of cooling melted thermoplastic resin in a continuous extruder having a primary mixing zone and a final mixing zone, which comprises directly injecting a coolant having a lower boiling point than said thermoplastic resin and being inactive to said resin, into the melted thermoplastic resin while mixing the resin in the primary mixing zone of the extruder at a temperature in the range of about 175° C, injecting said coolant at a temperature sufficiently lower than said melted thermoplastic resin and cooling said melted thermoplastic resin to a temperature in the range of about 130° C to 156° C before entrance into the final mixing zone of the extruder; said coolant being injected through a coolant inlet injection orifice formed in the wall of said extruder downstream of the resin inlet and said coolant being injected at a definite weight ratio of about 6.8 to 13.4 percent relative to the extruded thermoplastic resin, said extruder having a coolant vent orifice arranged downstream of said coolant inlet in the primary mixing zone of said extruder, and said extruder further being provided with an external indirect cooling jacket; uniformly mixing said coolant with said thermoplastic resin in said primary mixing zone; and removing said coolant through said coolant vent orifice before mixing the cooled thermoplastic resin in the final mixing zone of the extruder with indirect cooling through said cooling jacket and recovering the cooled mixed resin from said final mixing zone.

2. Method according to claim 1, wherein said coolant is liquid nitrogen.

3. Method according to claim 1, wherein said resin is polyethylene.

4. Method according to claim 1, wherein said cooling jacket is cooled by water.

5. Method of cooling melted polyethylene thermoplastic resin in a continuous extruder having a primary mixing zone, a final mixing zone, a coolant inlet orifice from injecting coolant into said primary mixing zone, and a vent orifice downstream of said coolant inlet orifice in said primary mixing zone, which comprises continuously charging said melted resin to the primary mixing zone at a temperature of said resin in the range of about 175° C; selecting an inactive coolant having a lower boiling point than that of said melted resin; directly injecting said coolant into said melted resin through said coolant inlet orifice while continuously mixing said resin in the primary mixing zone, and maintaining said coolant at a temperature substantially lower than that of said melted resin and cooling said melted resin to a temperature of about 130° C to 156° C adjacent to the vent orifice in the primary mixing zone of said extruder, the injection of coolant into the melted resin in the primary mixing zone of the extruder being carried out at a constant weight ratio of about 6.8% to about 13.4% relative to the extruded polyethylene resin; thoroughly mixing said coolant with said melted polyethylene resin in said primary mixing zone; and removing said coolant through said vent before recovering the cooled polyethylene resin from the final mixing zone of the extruder.

6. Method according to claim 5, wherein said coolant is water.

* * * * *